United States Patent [19]
Grodsinsky et al.

[11] Patent Number: 5,744,803
[45] Date of Patent: Apr. 28, 1998

[54] RADIATION DETECTOR ASSEMBLY AND METHOD WITH DISCRIMINATION BETWEEN VIBRATION AND RADIATION INDUCED EVENTS

[75] Inventors: Carlos M. Grodsinsky, Strongsville; Kevin D. Kimmich, Kirtland, both of Ohio

[73] Assignee: Saint-Gobain Industrial Ceramics, Inc., Worcester, Mass.

[21] Appl. No.: 710,698

[22] Filed: Sep. 19, 1996

[51] Int. Cl.$^6$ .................................................. G01T 1/20
[52] U.S. Cl. ..................... 250/369; 250/254; 250/261; 250/262
[58] Field of Search .................... 250/254, 261, 250/262, 369

[56] References Cited

U.S. PATENT DOCUMENTS

| | | | |
|---|---|---|---|
| 4,879,463 | 11/1989 | Wraight et al. | 250/254 |
| 5,023,450 | 6/1991 | Gold | 250/261 |

*Primary Examiner*—Don Wong
*Attorney, Agent, or Firm*—Volker R. Ulbrich; Don W. Bulson

[57] ABSTRACT

A well logging instrument and method that remove vibration induced noise from the output of a detector including a scintillation crystal. The invention is based on a realization that pulses induced by vibration during MWD operations are characteristically periodic, whereas pulses generated down hole by gamma rays occur at random intervals and are characteristically non-periodic. The instrument and method involve positioning a scintillation crystal package in the high vibration environment for interaction with incident radiation, using a light sensing device to convert photons received from the scintillation crystal package into an electrical signal which over time is composed of radiation induced events that are non-periodic and vibration induced events that are periodic, distinguishing the periodic events using a time history of the electrical signal, and removing the periodic events from the electrical signal to provide a corrected electrical signal from which vibration induced components have been removed. Also disclosed is a method for using the information gathered for vibration induced events to give an indication of the remaining lifetime of the scintillation crystal.

11 Claims, 3 Drawing Sheets

RADIATION DETECTOR ASSEMBLY AND METHOD WITH DISCRIMINATION BETWEEN VIBRATION AND RADIATION INDUCED EVENTS

The invention herein described relates generally to a borehole logging instrument and method for performing nuclear radiation-based measurements and particularly natural Gamma ray measurements, although the apparatus and method may have other applications, particularly those plagued by vibration induced counts intermixed with radiation induced counts.

BACKGROUND OF THE INVENTION

Scintillation detectors heretofore have been employed in the oil and gas industry for well logging. Such detectors have used thallium activated sodium iodide crystals that are very effective in detecting gamma rays. The crystals have been enclosed in metal tubes or casings to form a crystal package. The crystal package has an optical window at one end of the casing which permits radiation induced scintillation light to pass out of the crystal package for measurement by a light sensing device such as a photomultiplier tube coupled to the crystal package. The photomultiplier tube converts the light photons into electrical pulses that are shaped and digitized by associated electronics. Pulses that exceed a threshold level are registered as counts that may be transmitted up hole to analyzing equipment or stored locally.

The ability to detect gamma rays makes it possible to analyze rock strata surrounding the bore hole, as by measuring the gamma rays coming from naturally occurring radioisotopes in down hole shales which bound hydrocarbon reservoirs. Today a common practice is to take measurements while drilling. For measurement while drilling (MWD) applications, the detector must be capable of withstanding high temperatures and also must have high shock resistance. At the same time there is a need to maintain performance specifications.

A problem associated with MWD applications is that the detector will report a higher than an actual count rate if the scintillation crystal package produces vibration induced light pulses. The harsh shock and vibration conditions the detectors encounter during drilling can cause a crystal package to emit spurious light pulses in addition to gamma ray induced light pulses. That is, the detector output will be composed of radiation induced counts and vibration induced counts. Heretofore, the detector electronics could not distinguish the vibration induced counts from the genuine gamma counts, whereby the detector reports a higher than actual count rate. The problem is more severe when detecting low level radiation events while the detector is being subjected to a very severe dynamic operational environment.

Attempts have been made to compensate for this known phenomenon. One such attempt sought to filter out non-gamma induced counts by discriminating on the basis of the pulse shape or decay time, but this has not been proven to be very reliable. Still another attempt, described in U.S. Pat. No. 5,483,061, sought to distinguish gamma ray induced pulses from shock induced pulses by identifying detector pulses which occur within a predetermined time interval from a previous pulse as shock induced pulses, while pulses that occur after a predetermined time interval from a previous pulse are identified as gamma ray induced pulses. The pulse which is used to reference the delay gate is assumed to be an actual event. This may not be the case, and therefore error is introduced in proportion to the sampling window of the measurement of interest. More particularly, the technique described in said patent has no way to discriminate between a radiation induced count and a vibration induced count, and the delay gate is triggered by either. While the gate is "closed", radiation counts may occur and be rejected by the system. When the gate opens again, the system could count a vibration induced count rather than a radiation induced count. The response to radiation pulses and vibration pulses would thus vary erratically as a function of their count rates. The count rate value measured by the system might or might not correspond to the actual number of gamma ray photons that strike the crystal.

SUMMARY OF THE INVENTION

The present invention provides a well logging instrument and method that remove vibration induced noise from the output of a detector including a scintillation crystal. A further benefit afforded by the invention is the provision of an indicator that a detector has failed and/or a measure of the remaining anticipated life of a detector derived from a total energy history of the scintillation crystal assembly. The invention is based on a realization that pulses induced by vibration during MWD operations are characteristically periodic, whereas pulses generated down hole by gamma rays occur at random intervals and are characteristically non-periodic.

Accordingly, a radiation detector assembly and method for making radiation-based measurements in a high vibration environment according to the invention involve the positioning of a scintillation crystal package in the high vibration environment for interaction with incident radiation, using a light sensing device to convert photons received from the scintillation crystal package into an electrical signal which over time is composed of radiation induced events that are non-periodic and vibration induced events that are periodic, distinguishing the periodic events using a time history of the electrical signal, and either sorting or removing the periodic events from the time history to provide a corrected data stream (time history) from which vibration induced components have been accounted for or removed.

According to one particular embodiment of the invention, a Fourier transform is performed on the output signal of the detector and a table of component frequencies is extracted from the transformed data. The table is then analyzed to determine whether vibration induced noise is present in the signal, periodic events corresponding to strong peaks in the Fourier transform. If vibration induced noise is present, periodic pulses that occur at the identified discrete frequencies (that correspond to strong peaks in the Fourier spectrum) are decimated. This results in a corrected time history consisting of the non-periodic portion of the signal, i.e., the radiation induced pulses.

According to another particular embodiment of the invention, the frequencies or periodic components of the electrical signal are determined from a geometrical representation of the time history. More particularly, the time history is represented as a closed N−1 sided regular polygon where N is the number of samples in the time history. A series of k sided regular polygons {k=1, 2, 3, . . . N−1} are inscribed in the N−1 sided polygon, each one being inscribed with its first vertice at successive points in the sample, effectively rotating the inscribed polygon around and within the N−1 sided polygon. The sum of the samples at each of the k sides for each incremental rotation is stored. A plot of the sum versus the length of the sides of the inscribed polygon would reveal any periodic components as peaks in the plot. Each sample at the k vertices could then be removed from the time history, leaving behind only the radiation counts.

According to another aspect of the invention, the strength of the frequency components of the vibration induced noise signal may be used to provide a measure of the dynamic environment in that the magnitude of the frequencies will increase as the g-level increases. In particular, the dynamic energy imparted to the scintillation crystal may be measured, and the remaining life of the detector may be calculated as a function of this measurement, and an appropriate output or warning may be issued to indicate remaining life or life expiration. Also, the frequency content of the detector signal may be monitored and analyzed for a change in frequency content as an indicator of wear or failure of the detector.

Accordingly, there is provided a method for determining wear or failure of a detector subjected to a high vibration environment, the detector including a scintillation crystal and a light sensing device optically coupled to the scintillation crystal and operative to convert photons emitted by said scintillation crystal into an electrical signal. The method comprises the steps of positioning a scintillation crystal package in the high vibration environment for interaction with incident radiation, using a light sensing device to convert photons received from the scintillation crystal package into an electrical signal which over time is composed of radiation induced events that are non-periodic and vibration induced events that are periodic, identifying and monitoring the frequency content of the detector signal, and providing an indication of wear or failure as a function of the monitored frequency content. In one particular embodiment, the strength of the identified frequency components of the vibration induced noise signal is determined, and an indication of wear or failure is provided as a function of determined strength of the identified frequency components. In another particular embodiment, an indication of wear or failure of the detector is provided as a function of a change in the frequencies of the identified frequency components.

The foregoing and other features of the invention are hereinafter fully described and particularly pointed out in the claims, the following description and annexed drawings setting forth in detail certain illustrative embodiments of the invention, these embodiments being indicative, however, of but a few of the various ways in which the principles of the invention may be employed.

DETAILED DESCRIPTION

Figure 1:
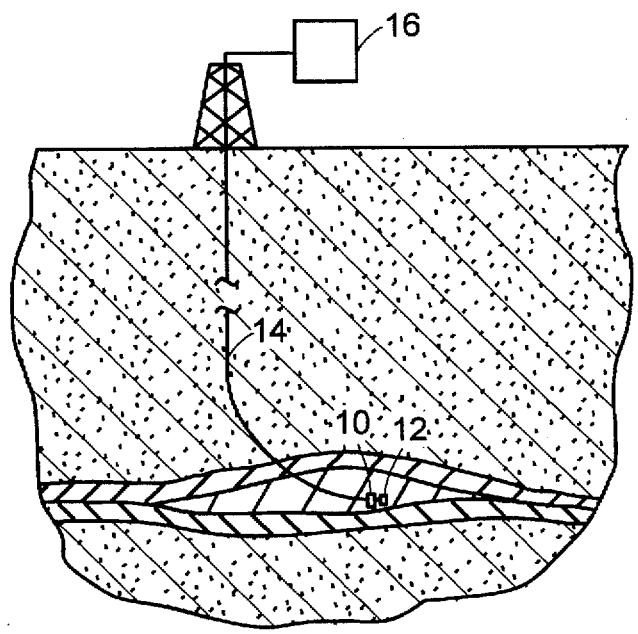
FIG. 1 is a schematic illustration of a well drilling operation.

As above mentioned, the ability to detect gamma rays makes it possible to analyze rock strata surrounding a bore hole, as by measuring the gamma rays coming from naturally occurring radioisotopes in down hole shales which bound hydrocarbon reservoirs. These radiation measurements may be taken while drilling by locating downhole, in a well known manner, a radiation detector instrument or assembly 10 in the vicinity of a drilling head 12 as schematically depicted in FIG. 1. The radiation detector assembly 10 is carried by the drill string 14 and communicates with analyzing equipment 16 at the surface via an appropriate communications link.

Figure 2:
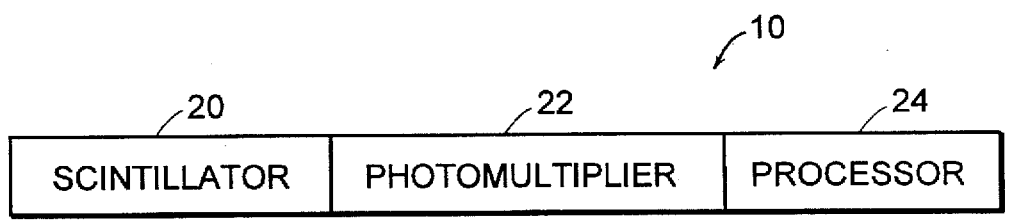
FIG. 2 is a diagrammatic illustration of a radiation detector assembly according to the invention.

As diagrammatically shown in FIG. 2, the radiation detector assembly 10 according to the present invention generally comprises a scintillation crystal package 20, a light sensing device such as a photomultiplier tube 22 and a processor 24. Each of these components and the functions thereof are described below.

Figure 3:
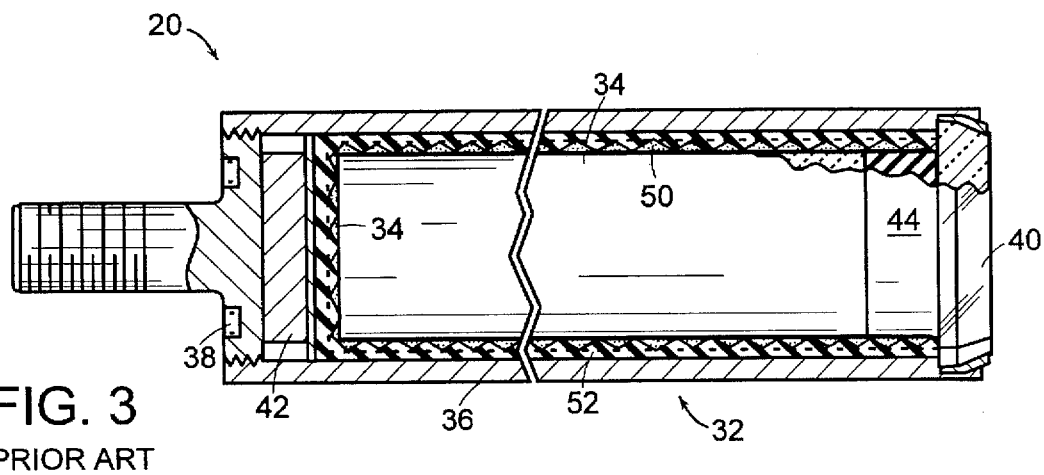
FIG. 3 is a sectional view of a prior art scintillation crystal package.

The scintillation package 20 may be a standard scintillation package like that shown in FIG. 3. This scintillation crystal package comprises a container 32 enclosing a scintillation crystal 34. The crystal 34 may be, for example, a thallium-activated sodium iodide crystal of cylindrical shape. The container 32 may include a tubular metal casing 36 which preferably is cylindrical like the crystal. The casing 36 is closed at its rear end by a back cap 38 and at its front end by an optical window 40. The optical window 40 should be made of a material transmissive to scintillation light given off by the scintillation crystal. A spring or compression pad 42 preferably is provided to axially load the crystal and bias it toward the optical window to maintain an optical coupling via a layer 44 of suitable optical coupling material, for example silicone rubber, positioned between the front end face of the crystal and the inner face of the optical window.

The crystal is surrounded by a layer 50 of reflecting material which in turn may be surrounded by a shock absorbing boot 52. The layer 50 of reflecting material is a white thin porous PTFE material tightly wrapped around the crystal. The shock absorbing boot 52 closely surrounds and preferably slightly grips the reflector layer 50 to aid in holding the PTFE reflector film tight against the crystal. The boot is made of resilient material such as silicone rubber. A reflector 54 also is provided at the end of the crystal opposite the window 40.

Reverting to FIG. 2, the photomultiplier tube is coupled to the scintillation crystal package 20 for measuring light passing out of the crystal package through the optical window. During a well logging operation, such light would be composed of radiation induced scintillation light arising from interactions between gamma rays and the scintillation crystal. The photomultiplier tube (PMT) converts the collected light photons into electrical pulses that are shaped and digitized by associated electronics in the processor 24. Pulses that exceed a threshold level are registered as counts that may be transmitted up hole to analyzing equipment and these counts would be representative of detected scintillation events if photons collected by the PMT included only radiation induced photons.

As above discussed, a problem exists in measurement while drilling (MWD) applications where the detector is subjected to harsh shock and vibration conditions. This has caused the crystal package to emit spurious light pulses in addition to gamma ray interaction light pulses. That is, the detector output will be composed of radiation induced counts and vibration induced counts. The result is that the instrument will report a higher than actual count rate if the scintillation crystal package produces vibration induced light pulses.

Figure 4:
FIG. 4 is a schematic illustration of an output signal wherein radiation induced pulses are shown in solid line and vibration induced pulses are shown in broken line.

It has been found that pulses induced by vibration during MWD operations are characteristically periodic (typically related to the resonant frequencies of the detector at which the detector is excited by exposure to the harsh shock and vibration conditions downhole), whereas pulses generated down hole by gamma rays occur at random intervals and are characteristically non-periodic. This is schematically depicted in FIG. 4 which illustrates an output signal of the PMT wherein radiation induced pulses are shown in solid line and vibration induced pulses are shown in broken line. Although the vibration (mechanically) induced pulses are shown as occurring at a single frequency, typically the vibration induced pulses will occur at several different frequencies typically respectively associated with different vibration modes.

The present invention takes advantage of this observed physical phenomena and provides a means by which the vibration induced periodic components of the PMT output signal may be distinguished, i.e., identified. Once identified, the periodic components can be extracted (filtered) from the output signal leaving only the non-periodic radiation induced component. The extracted periodic components may also be otherwise used, for example to provide an indicator that a detector has failed and/or a measure of the remaining anticipated life of a detector derived from the total dynamic time history of the scintillation crystal.

Succinctly, a method for making radiation-based measurements in a high vibration environment according to the invention involves positioning the scintillation crystal package 20 in the high vibration environment for interaction with incident radiation; using the PMT 22 to convert photons received from the scintillation crystal package into an electrical signal which over time is composed of radiation induced events that are non-periodic and vibration induced events that are periodic, distinguishing, as in processor 24, the periodic events using a time history of the electrical signal, and removing the periodic events from the electrical signal to provide a corrected electrical or digital signal from which vibration induced components have been removed. A digitization of the time history should be taken over a minimum sampling frequency of about 2.5 to 3 times the highest anticipated periodic component of the detector, and more preferably at about 5 times oversampling. For analog processing, the band width of the analog signal should be about 2.5 to 3 times the highest anticipated periodic component, and more preferably about 5 times.

Figure 5:
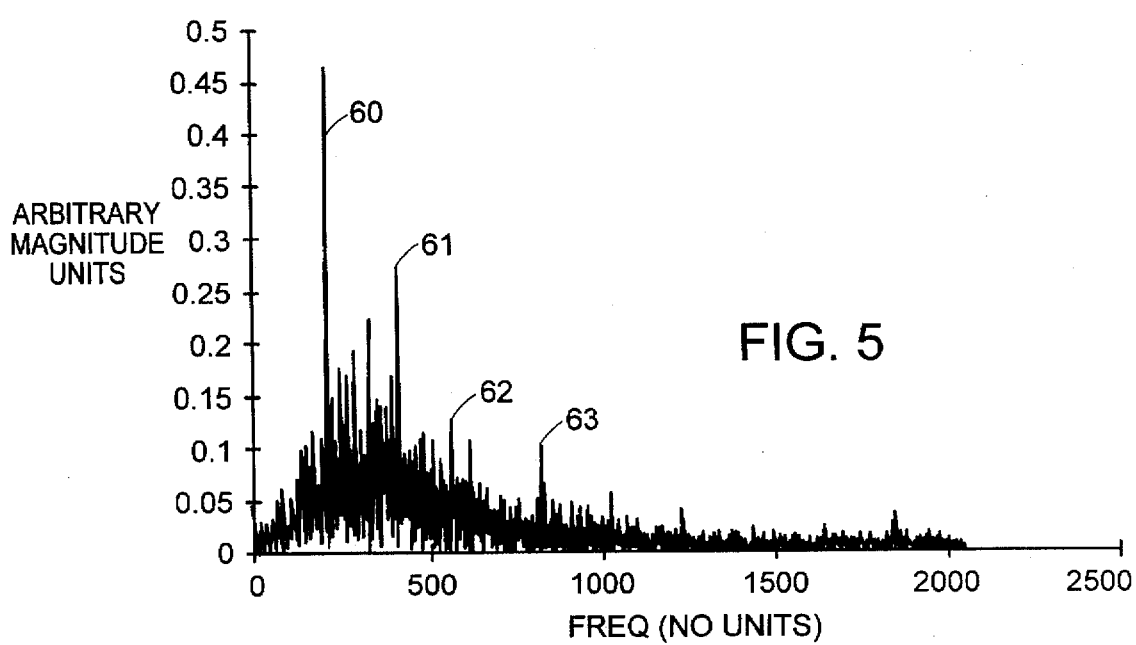
FIG. 5 shows a fast Fourier transform of a simulated detector signal wherein peaks in the spectrum identify the frequencies of periodic components in the signal.
Figure 6:
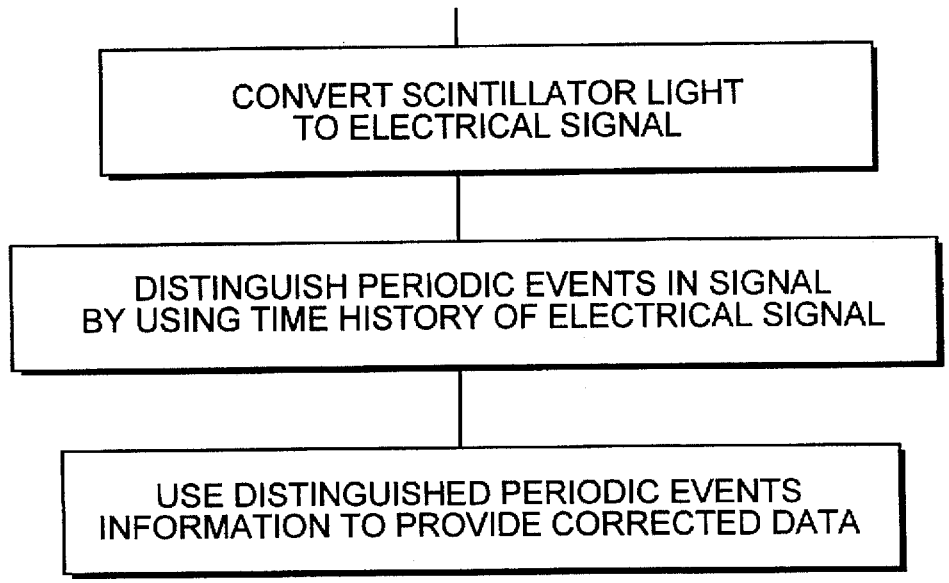
FIG. 6 is a flow chart of the steps of a method in accordance with the invention for making radiation-based measurements in a high vibration environment.
Figure 7:
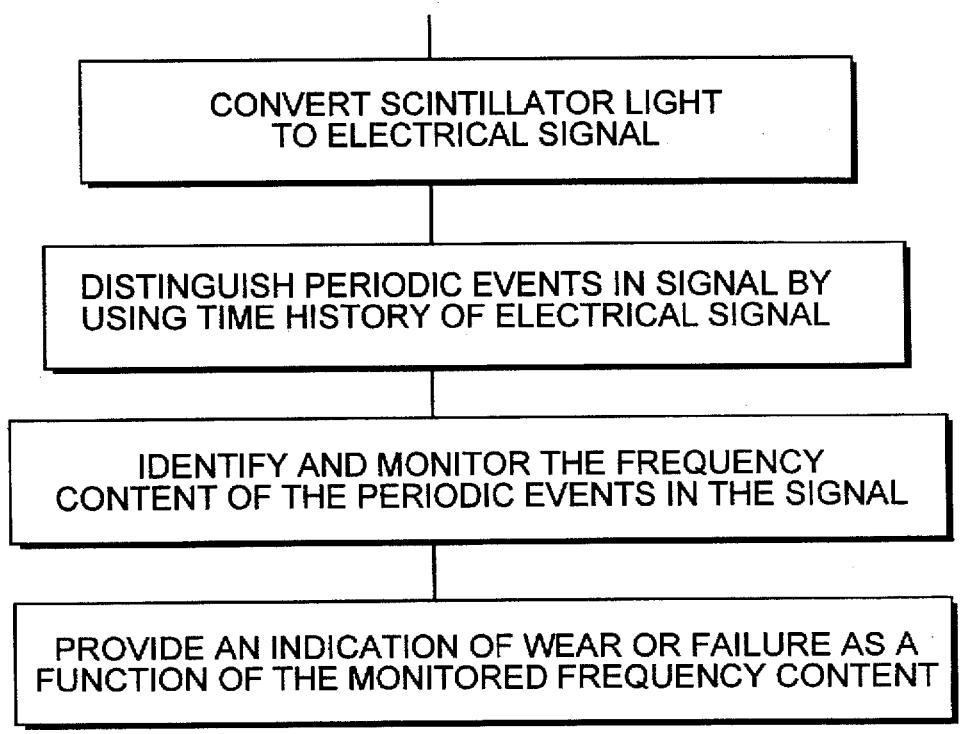
FIG. 7 is a flow chart of the steps of a method in accordance with the invention for determining wear or failure of a detector subjected to a high vibraton environment.

According to one particular embodiment of the invention, the processor 24 performs a fast Fourier transform (FFT) on the output signal of the PMT 22 and a table of component frequencies is extracted by discriminating the frequency data from the transformed data and then performing an inverse FFT. The table is then analyzed to determine whether vibration induced noise is present in the signal, periodic events corresponding to strong peaks in the Fourier transform. In FIG. 5, an FFT of a simulated detector signal is shown with peaks 60–63 in the spectrum identifying the frequencies of periodic components of the electrical signal by discriminating strong frequency components above a predetermined (suitably selected) discrimination of the Fourier magnitude. If vibration induced noise is present as in the case of FIG. 5, the detector signal has eliminated therefrom any pulses that occur at the identified discrete frequencies corresponding to strong peaks in the Fourier transform. This leaves behind the non-periodic portion of the signal, i.e., the radiation induced pulses.

According to another particular embodiment of the invention, the frequencies of periodic components of the electrical signal are determined from a geometrical representation of the time history which lends itself to faster processing of the detector signal. More particularly, the time history is represented as a closed N−1 sided regular polygon where N is the number of samples in the time history. Then, k sided regular polygons are inscribed in the N−1 sided polygonal representation of the time signal over k−1 phase angles. The number of pulses which occur at each of the k vertices for each phase angle is counted, and peaks in a plot of the sum of the pulses per length of the side of the k sided polygon are identified, thereby to determine the frequency of periodic components of the electrical signal. In other words, a series of k sided regular polygons {k=1, 2, 3, ... N−1} are inscribed in the N−1 sided polygon, each one being inscribed with its first vertice at successive points in the sample, effectively rotating the inscribed polygon around and within the N−1 sided polygon. The sum of the samples at each of the k sides for each incremental rotation is stored. A plot of the sum versus the length of the sides of the inscribed polygon would reveal any periodic components as peaks in the plot. Each sample at the k vertices could then be removed from the time history, leaving behind only the radiation counts.

The foregoing methodology may be differently but equivalently stated as follows. Initially, the signal is sampled at a period substantially more than the period of any anticipated periodic component of the signal, this providing a set of data points describing the signal of a selected period of time. A plurality of subsets of data points are then taken from the data set, wherein each subset comprises the jth point of the data set and every kth point thereafter, and k is a positive integer less than the number of data points in the data set and j is a positive integer less than k, and for which all subsets do not have identical values of j and k. For each subset, the data associated with the data points of that subset is combined; and the combined data for the subsets then compared for differences between them so as to determine for which value(s) of k a periodicity is present. The identified k values represent and thus identify respective frequencies of the periodic components of the detector signal.

As previously mentioned, the strength of the identified frequency components of the vibration induced noise signal may be used to provide a measure of the dynamic environment in that the strength of the frequencies will increase as the g-level increases. In particular, the energy absorbed by the scintillation crystal may be measured, and the remaining life of the detector may be calculated as a function of exposure time to the dynamic environment, and an appropriate output or warning may be issued to indicate remaining life or life expiration. Also, the frequency content of the detector signal may be monitored and analyzed by the processor 24 for a change in frequency content as an indicator of wear or failure of the detector.

Preferably, the processor is physically integrated into a detector assembly package along with the scintillation crystal package and the light sensing device, i.e., the PMT. Accordingly, the detector assembly package produces a "clean" output signal composed only of counts corresponding to the radiation induced events and not any vibration induced events. However, in an alternative embodiment, the functions of the processor may be distributed among the detector assembly package and another component or components. For example, the detector assembly package located downhole may transmit the "dirty" output signal to the surface where it is processed in the foregoing manner to remove the periodic components therefrom.

Although the invention has been shown and described with respect to certain preferred embodiments, it is obvious that equivalent alterations and modifications will occur to others skilled in the art upon the reading and understanding of this specification. The present invention includes all such equivalent alterations and modifications.

What is claimed is:

1. A method for making radiation-based measurements in a high vibration environment, comprising the steps of:

positioning a scintillation crystal package in the high vibration environment for interaction with incident radiation, using a light sensing device to convert photons received from the scintillation crystal package into an electrical signal which over time is composed of radiation induced events that are non-periodic and vibration induced events that are periodic, distinguishing the periodic events using a time history of the electrical signal, and using the distinguished periodic events to provide corrected data from which vibration induced components have been discriminated.

2. A method as set forth in claim 1, wherein said distinguishing step includes taking a Fourier transform of the time history, identifying the frequencies of periodic events from strong peaks in the Fourier transform, and decimating the signal at the identified frequencies.

3. A method as set forth in claim 1, wherein said distinguishing step includes geometrically representing the time history and determining therefrom the frequencies of periodic components of the electrical signal.

4. A method as set forth in claim 1, wherein said distinguishing step includes representing the time history as a closed N−1 sided regular polygon where N is the number of samples in the time history, inscribing k sided regular polygons in the N-sided polygonal representation of the time signal over k−1 phase angles, counting the number of pulses which occur at each of the k vertices for each phase angle, and identifying peaks in a plot of the sum of the pulses per length of the side of the k sided polygon, thereby to determine the frequencies of periodic components of the electrical signal.

5. A radiation detector assembly for use in conditions of high vibration, comprising a scintillation crystal;

a light sensing device optically coupled to said scintillation crystal and operative to convert photons emitted by said scintillation crystal into an electrical signal which over time is composed of radiation induced events that are non-periodic and vibration induced events that are periodic; and a processor for using a time history of the electrical signal to distinguish the periodic events, and for using the distinguished periodic events to provide corrected data from which vibration induced components have been discriminated.

6. A radiation detector assembly as set forth in claim 5, wherein said light sensing device is a photomultiplier tube.

7. A radiation detector assembly as set forth in claim 6, wherein said scintillation crystal is enclosed with a casing having a window at one end for passage of photons to the photomultiplier tube.

8. A method for determining wear or failure of a detector subjected to a high vibration environment, the detector including a scintillation crystal and a light sensing device optically coupled to the scintillation crystal and operative to convert photons emitted by said scintillation crystal into an electrical signal, the method comprising the steps of positioning a scintillation crystal package in the high vibration environment for interaction with incident radiation, using a light sensing device to convert photons received from the scintillation crystal package into an electrical signal which over time is composed of radiation induced events that are non-periodic and vibration induced events that are periodic, identifying and monitoring the frequency content of the detector signal, and providing an indication of wear or failure as a function of the monitored frequency content.

9. A method as set forth in claim 8, wherein the identifying and monitoring step includes distinguishing the periodic events using a time history of the electrical signal and determining the strength of the identified frequency components of the vibration induced noise signal; and the providing step includes providing an indication of wear or failure as a function of the determined strength of the identified frequency components.

10. A method as set forth in claim 8, wherein the identifying and monitoring step includes distinguishing the periodic events using a time history of the electrical signal; and the providing step includes providing an indication of wear or failure of the detector as a function of a change in the frequencies of the identified frequency components.

11. A radiation detector assembly for use in conditions of high vibration, comprising a scintillation crystal;

a light sensing device optically coupled to said scintillation crystal and operative to convert photons emitted by said scintillation crystal into an electrical signal which over time is composed of radiation induced events that are non-periodic and vibration induced events that are periodic; and a processor for identifying and monitoring the frequency content of the electronic signal, and providing an indication of wear or failure of the scintillation crystal as a function of the monitored frequency content.

* * * * *